No. 743,776. PATENTED NOV. 10, 1903.
C. TRIM.
COUPLING FOR REACH POLES.
APPLICATION FILED JUNE 6, 1903.
NO MODEL.
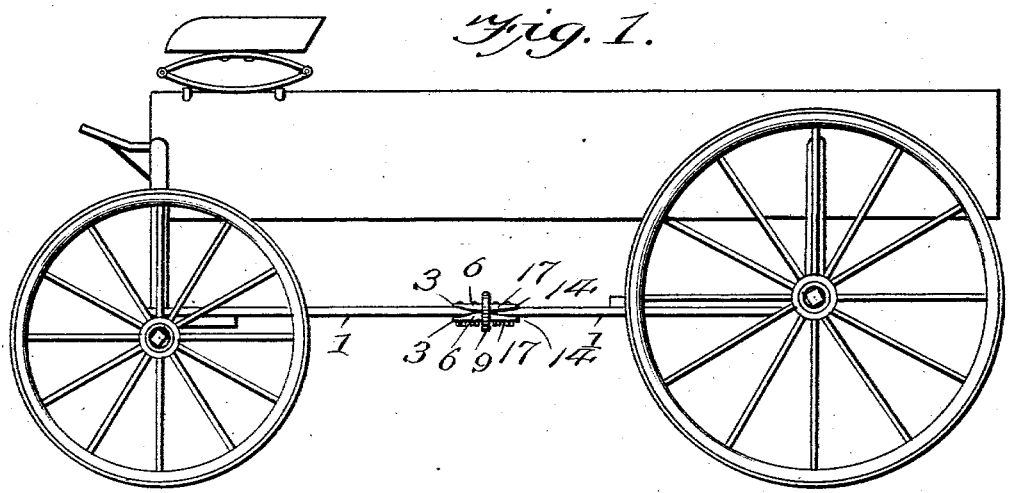
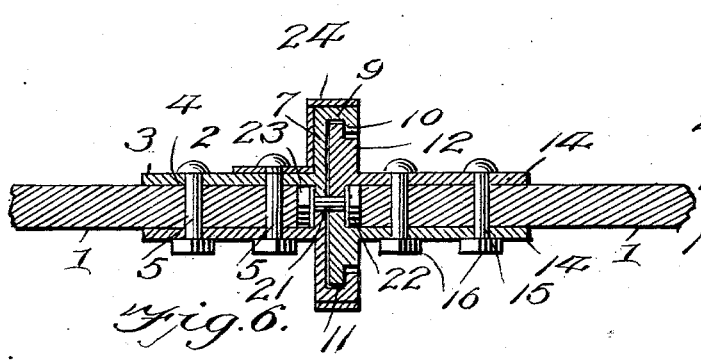
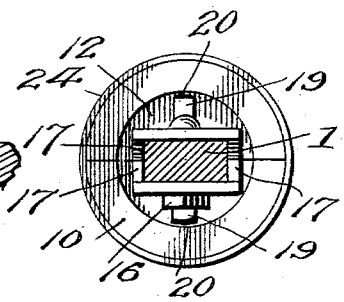
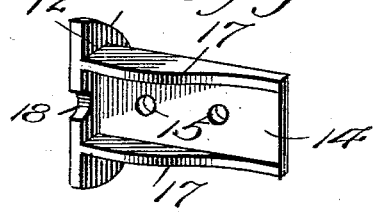
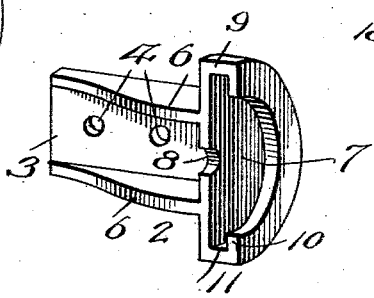
WITNESSES:
Geo. Ackman Jr.
O. J. Heylmun
INVENTOR
Charles Trim
BY
Victor J. Evans
Attorney No. 743,776. Patented November 10, 1903.

UNITED STATES PATENT OFFICE.

CHARLES TRIM, OF HOUGHTON, MICHIGAN.

COUPLING FOR REACH-POLES.

SPECIFICATION forming part of Letters Patent No. 743,776, dated November 10, 1903.

Application filed June 6, 1903. Serial No. 160,411. (No model.)

*To all whom it may concern:*

Be it known that I, CHARLES TRIM, a citizen of the United States, residing at Houghton, in the county of Houghton and State of Michigan, have invented new and useful Improvements in Couplings for Reach-Poles, of which the following is a specification.

My invention has relation to new and useful improvements in couplings for reach-poles, and more especially to couplings of that type which are employed in connection with a pole made of two sections for the purpose of permitting said sections to have a rotary movement with relation to each other, whereby torsional strain upon the pole will be obviated and the consequent breaking or weakening of said pole by the relative movement of the front and rear axles in passing over uneven surfaces will be prevented.

The object of the invention is to provide a device of the character above mentioned which will be extremely simple in construction and at the same time efficient and durable in use and which will effectually prevent the twisting and breaking of the reach-pole no matter to what degree the axles may become moved with relation to each other.

I attain the above-mentioned objects by the structure to be more fully described hereinafter and the novelty of which will be particularly pointed out and distinctly claimed.

The invention is fully and clearly illustrated in the accompanying drawings, forming a part of this specification, and wherein—

Figure 1 is a view of a wagon in side elevation, showing my invention applied in operative position on the reach-pole. Fig. 2 is a detail longitudinal section through the coupling. Fig. 3 is an end view of the coupling. Fig. 4 is a detail perspective view of one of the sections of which the socket-piece is constructed. Fig. 5 is a detail perspective view of one of the sections of which the head-piece is constructed. Fig. 6 is a detail perspective of the means for preventing the spreading of the sections of the socket-piece when subjected to excessive strain.

Referring to the drawings, 1 1 designate the sections of a reach-pole, which are preferably rectangular in cross-section and of such dimensions and strength to adapt them to the purposes for which they are employed. The outer ends of the pole-sections are rigidly secured to the front and rear axles, respectively, in any suitable manner, and their inner ends terminate closely adjacent each other, where they are connected by means of my improved coupling in order that they may have a rotary movement with relation to each other to compensate for the movements of the axles.

This coupling is constructed as follows: I provide the inner end of one of the pole-sections with a socket-piece which comprises two substantially duplicate sections 2 2, consisting, respectively, of a securing-plate 3, provided with suitable apertures 4 to permit it being secured to the pole-section by means of bolts 5 or other suitable fastening means. Extending longitudinally of the securing-plate are laterally-extending flanges 6 6, which when the plate is in position on the pole are adapted to embrace the opposite sides of said pole. At its front portion the plate 3 has formed integrally therewith a semicircular plate 7, the straight side of which is formed with a recess 8, as shown in Fig. 4 of the drawings. This semicircular plate is provided upon its curved edge with a vertical flange 9, which flange is in turn formed with a laterally and inwardly projecting portion 10, extending over and substantially parallel to the plate 7, whereby a channel 11 is formed, substantially as shown in Fig. 4, around the curved edge of the plate. As shown in the drawings, the two sections 2 2 are constructed to be arranged upon opposite sides of the reach-pole, and when in such position the straight edges of the plates will be brought together. The recesses 8 will then register to form a central opening, and the flanges 9 10 and channels 11 will register to form a circular socket-piece formed with a circumferential flange and a continuous channel. This socket-piece is designed to receive and retain a head 12, mounted on the end of the opposite reach-section, the said socket-piece and head being combined and coacting in the manner which will now be described.

The head 12 comprises a circular plate provided with suitable means for securing it in position on the reach-pole and is constructed of similar sections, each of which comprises a semicircular plate 13, from the back of which projects a rearwardly-extending attaching-plate 14, adapted to be attached to the end of the reach-pole and provided with bolt-openings 15, through which bolts 16 are projected for the purpose of holding the plate 14 in position. The plate 14 in a manner similar to the plates 3 3 is provided at its longitudinal edges with flanges 17, which are adapted to embrace the reach-pole and which are secured at one end to the semicircular plate 13 to strengthen and support the same. These similar sections are each provided at the center point of its straight side with a recess 18, substantially as shown in Fig. 5. The sections as just described are secured in position upon opposite sides of the reach-pole and when operatively applied are so arranged as to bring the straight sides into engagement, whereby the two semicircular plates will combine to form a circular head, and the recesses 18 therein will register to form a circular opening in the center of said head. At the point of junction between the semicircular plate and the attaching or securing plate is a lateral projection 19, formed integrally with said plate and having a curved outer edge 20, said projection being employed for the purpose hereinafter described. The circular head 12, formed by the sections, is of such a size as to fit loosely within the socket-piece, the edge of the said plate being located within the circumferential channel 11 and held in position against longitudinal displacement by means of the inwardly-projecting portion 10, substantially as shown in Fig. 2 of the drawings. It will be seen that when in the position just described the socket and head pieces will be free to have a rotary movement with relation to each other and that the relative movement of the axles will not twist or break the reach-pole.

For the purpose of providing an additional means for securing the head and socket pieces together and to distribute the strain which would otherwise be upon the overhanging portion 10 alone I employ a coupling-bolt 21, the head 22 of which is seated in the space between the end of the reach-pole and the head 13 and the shank of which is projected through the central openings in the socket and head pieces and is secured in position by means of a nut 23, situated between the socket-piece and the reach-pole, to which it is attached. Suitable washers may be interposed between the head 22 of the bolt and the head-piece and the nut 23 and the socket-pieces to prevent wear of the parts.

The head-piece 13 and the socket-piece are assembled in operative relation as follows: The head-piece 12 is secured in place on the reach-pole, as above described, with the bolt 21 in position and projecting therefrom, after which one of the sections of the socket-piece is fastened in position on the other section of the pole. The head is then inserted into the said section from the straight side thereof, and the bolt is seated in the recess in the plate 7. The remaining section of the socket-piece is then fastened in position by means of the bolts 5, and the head and socket pieces will be secured together.

To prevent the sections comprising the socket-piece from being spread apart, and consequently weakened, by reason of any lateral movement which the sections of the reach-pole may have with relation to each other, I provide a simple and effective means for preventing the spreading of said sections. This means consists of a collar 24, which fits snugly about the periphery of the socket-piece and prevents any movement tending to spread the jaws, and consequently limits the lateral movement of the reach-sections and insures a rigid connection. This collar is secured in position by means of an arm 25, secured to the collar and provided with an extension 26, which is adapted to be engaged and locked to the socket-piece by means of one of the bolts 5, substantially as shown.

When the head-piece is in operative position in the socket-piece, the curved edges of the projections 19 are adapted to bear against the edge of the portion 10 and serve to center the head within the socket to relieve the bolt 21 of strains tending to break the same and also to limit the lateral movement of the head and socket piece with relation to each other.

It will be seen from the above description, taken in connection with the drawings, that I provide a coupling which is simple in construction and which will compensate for torsional movement to which the reach-pole is subjected as a result of relative moments of the axles of the vehicle.

Having thus fully described my invention, what I claim as new is—

1. In a coupling for a reach-pole, the combination with a reach-pole comprising two sections of a head secured to one of the sections, said head comprising a circular plate, formed from two semicircular plates secured to opposite sides of the pole-section, and a socket-piece, in which the head is located secured to the other section of the reach-pole.

2. In a coupling for a reach-pole, the combination with a reach-pole comprising two sections of a head secured to one of the sections, a socket-piece in which the head is located secured to the other section, said socket-piece comprising duplicate sections, and a collar to hold the sections together.

3. In a coupling for a reach-pole, the combination with a reach-pole comprising two sections, of a head comprising a circular plate formed from two semicircular plates, each provided with an attaching-plate adapted to be secured upon the opposite sides of one section of the reach-pole and a socket-piece carried by the other section.

4. In a coupling for a reach-pole, the combination with a reach-pole, comprising two sections, of a head comprising a circular plate formed from two semicircular plates, and a socket-piece in which the head is located, said socket-piece consisting of two semicircular plates having channels at their curved edges.

5. In a coupling for a reach-pole, the combination with a reach-pole comprising two sections, of a head comprising two semicircular plates each of which is provided with a securing-plate adapted to be fastened to the pole and formed with edge flanges to embrace opposite sides of the pole, and a socket in which the head is located on the other pole-section.

6. In a coupling for a reach-pole, the combination with a reach-pole, comprising two sections, of a head on one of the sections, a socket-piece in which the head is located on the other pole-section, said socket-piece comprising two semicircular plates formed on their curved edge with a flange and an inwardly-projecting portion on the flange said plates being adapted when assembled to form a circular socket-piece, and a collar around the socket-piece to prevent its parts from spreading.

7. In a coupling for a reach-pole the combination with a reach-pole comprising two sections of a head on one of the sections, a socket-piece in which the head is located on the other section, and comprising duplicate sections, means to prevent spreading of the sections, and means carried by the head to center it in the socket-piece.

8. In a coupling for a reach-pole, the combination with a reach-pole comprising two sections of a head on one of the sections, said head being provided with lateral projections, a socket-piece in which the head is located on the other pole-section, said socket-piece comprising two semicircular plates formed with a flange and an inwardly-projecting portion on the flange against which the projections on the head abut, said plates being adapted when assembled to form a circular socket-piece, and means to prevent spreading of the parts of the socket-piece.

9. In a coupling for a reach-pole comprising two sections, the combination of a head on one of the sections comprising duplicate parts, each of which consists of a semicircular plate having a recess in its straight edge, a flanged securing-plate, and a projection at the junction of the semicircular and securing plates, said parts being adapted to be assembled to form a circular head having a central opening, and a socket-piece on the other pole-section in which the head is located.

10. In a coupling for a reach-pole, the combination with a pole comprising two sections of a head comprising duplicate parts on one of the sections and a socket-piece also comprising duplicate parts on the other section and in which the head is located and a bolt extending centrally through the head and socket-piece to secure the same together.

In testimony whereof I affix my signature in presence of two witnesses.

CHARLES TRIM.

Witnesses:
 J. G. BERTRAND,
 JAS. OSBORNE.